United States Patent
Ballester et al.

(10) Patent No.: US 7,616,724 B2
(45) Date of Patent: Nov. 10, 2009

(54) METHOD AND APPARATUS FOR MULTI-MODULATION FRAME SYNCHRONIZATION IN A DIGITAL COMMUNICATION SYSTEM

(75) Inventors: Raul Benet Ballester, Premla de Mar (ES); Adriaan J. De Lind Van Wijngaarden, New Providence, NJ (US); Ralf Dohmen, VS-Villingen (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1015 days.

(21) Appl. No.: 10/957,527

(22) Filed: Sep. 30, 2004

(65) Prior Publication Data

US 2006/0067369 A1    Mar. 30, 2006

(51) Int. Cl.
*H04L 7/00* (2006.01)
(52) U.S. Cl. ....................... 375/365; 375/354
(58) Field of Classification Search ............. 375/354, 375/365
See application file for complete search history.

(56) References Cited

U.S. PATENT DOCUMENTS

| | | | | |
|---|---|---|---|---|
| 4,247,936 A | * | 1/1981 | Hustig | 370/509 |
| 4,335,446 A | | 6/1982 | Gandini et al. | |
| 4,494,239 A | | 1/1985 | Martin | |
| 4,651,319 A | | 3/1987 | Bowlds | |
| 4,768,188 A | * | 8/1988 | Barnhart et al. | 370/434 |
| 5,151,925 A | * | 9/1992 | Gelin et al. | 375/328 |
| 5,185,736 A | * | 2/1993 | Tyrrell et al. | 370/358 |
| 5,220,448 A | | 6/1993 | Vogel et al. | |
| 5,265,105 A | * | 11/1993 | Iwane | 375/365 |
| 5,276,709 A | * | 1/1994 | Kazawa et al. | 375/242 |
| 5,285,458 A | * | 2/1994 | Yoshida | 714/775 |
| 6,148,045 A | * | 11/2000 | Taura et al. | 375/344 |
| 6,172,993 B1 | * | 1/2001 | Kim et al. | 370/516 |
| 6,275,537 B1 | | 8/2001 | Lee | |
| 7,039,132 B1 | * | 5/2006 | Chen et al. | 375/334 |
| 2005/0008089 A1 | * | 1/2005 | Bothe et al. | 375/261 |
| 2006/0020433 A1 | | 1/2006 | Taha et al. | |

OTHER PUBLICATIONS

Muller-Weinfurtner, "Frequency-domain frame synchronization for optimum frequency-differential demodulation of ODFM", Global Telecommunications Conference, 1999, GLOBECOM '99 vol. 1B, 1999 pp. 857-862 vol. 1b.*
Habuchi, "A synchronization system with differential detector for the SS-CSC system", The 8th IEEE International Symposium on Personal, Indoor and Mobile Radio Communications, 1997, 'Waves of the Year 2000', PIMRC '97, vol. 3, Sep. 1-4, 1997 pp. 835-839 vol. 3.*
Robertson, "Optimum frame synchronization of preamble-less packets surrounded by noise with coherent and differentially coherent demodulation", IEEE International Conference on Communications, 1994, ICC 94, SUPERCOMM/ICC '94, Conference Record, Serving Humanity Through Communications, May 1-5, 1994 pp. 874-879 vol. 2.*

* cited by examiner

*Primary Examiner*—Juan A Torres

(57) ABSTRACT

A method and apparatus for frame synchronization in digital communication systems using multiple modulation formats perform a search for a differential frame alignment sequence (FAS) to frame-align the received digital stream and determine the polarity of the stream. Embodiments of the invention are compatible with Differential Phase Shift Keying (DPSK), Duobinary Signaling (DBS), and ON/OFF Keying (OOK) modulation formats.

19 Claims, 3 Drawing Sheets

METHOD AND APPARATUS FOR MULTI-MODULATION FRAME SYNCHRONIZATION IN A DIGITAL COMMUNICATION SYSTEM

FIELD OF THE INVENTION

The invention relates to the field of digital communication systems and, in particular, to frame synchronization in digital communication systems.

BACKGROUND OF THE INVENTION

In digital communication systems (e.g., high-speed optical communication systems) information sequences are transmitted, using a specific data protocol, in a form of repetitive structures referred to as "frames". Such systems require synchronization between a transmitter and a receiver of the information. To accomplish such synchronization, the transmitter inserts a frame alignment sequence (FAS), typically at the beginning of a frame. In the receiver, the FAS allows to determine the position of the frame in the received digital stream. A frame synchronization module, referred to herein as "framer", detects the FAS and monitors frame alignment once initial frame acquisition has been accomplished.

Typically, optical communication systems use an ON/OFF Keying (OOK) modulation format, and framers for such systems are known in the art. In the field of high-speed optical communication, Differential Phase Shift Keying (DPSK) and Duobinary Signaling modulation formats can offer significant advantages (e.g., a lower bit error rate) over the OOK format. To provide frame synchronization and determine the polarity of the received stream, these modulation formats require specialized frame synchronization algorithms. Conventional framers do not support multiple modulation formats. However, in a communication network, it is highly desirable to have framers which have an underlying algorithmic behavior that is independent from and cross-compatible with multiple modulation formats used by component digital communication systems.

Therefore, there is a need in the art for an improved method and apparatus for frame synchronization in digital communication systems using multiple modulation formats.

SUMMARY OF THE INVENTION

The present invention comprises a method and apparatus for frame synchronization in a digital communication system using multiple modulation formats.

In a first aspect of the invention, there is provided an apparatus for frame synchronization. In one embodiment, the apparatus includes a frame synchronization module having a search engine for a differential frame alignment sequence (DFAS), a module that inverts a digital stream, and a memory to store the DFAS. Embodiments of the apparatus provide frame synchronization and determine the polarity of a received digital stream that has been transmitted using OOK, DPSK, or DBS modulation.

In a second aspect of the invention, there is provided a method for frame synchronization. In one embodiment, using the invention performs a search for the DFAS to determine the polarity and accomplish frame synchronization of the received stream that has been transmitted using OOK, DPSK, or DBS modulation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention advantageously provides a method and apparatus for frame synchronization in digital communication systems using multiple modulation formats, such as a Differential Phase Shift Keying (DPSK) modulation format, a Duobinary Signaling (DBS) modulation format, and an ON/OFF Keying (OOK) modulation format.

Figure 1:
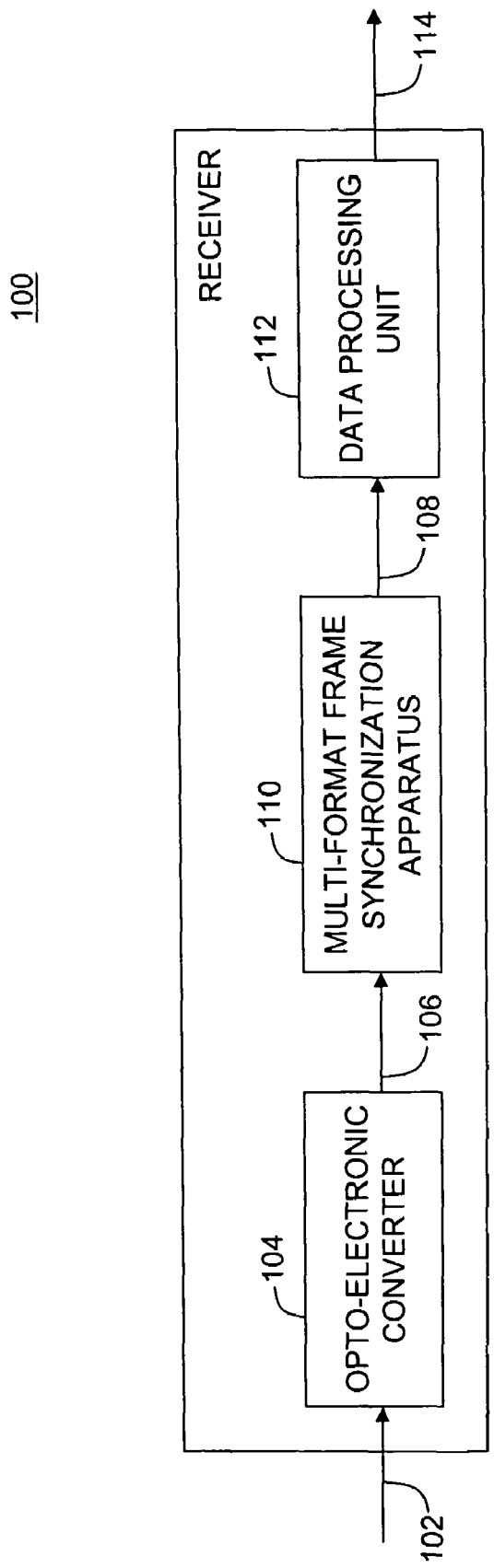
FIG. 1 depicts a schematic diagram of a receiver of an exemplary optical digital communication system in accordance with one embodiment of the present invention.

FIG. 1 depicts a schematic diagram of a receiver 100 of an exemplary optical communication system (not shown) having a bit rate of about 10 Gb/s or 40 Gb/s in accordance with one embodiment of the present invention. In one embodiment, the receiver 100 includes an opto-electronic converter 104, a multi-format frame synchronization apparatus (MFSA) 110, a connection path 108, and a data processing unit 112. In an alternate embodiment (not shown), the MFSA 110 may be a portion of the data processing unit 112. An optical input signal of the opto-electronic converter 104 is illustratively coupled to an output fiber 102 of the optical communication system. The opto-electronic converter 104 transforms a modulated optical signal in a digitized sequence (in particular, a binary stream) that, via an electrical interface 106, is provided to the MFSA 110.

The MFSA 110 detects a differential frame alignment sequence (DFAS) in the received digital stream and, in case of the DPSK and DBS modulation formats, additionally defines the otherwise ambiguous polarity of the received digital stream.

Herein, the polarity of the received digital stream is defined as "0" when the received digital stream may be forwarded to the data processing unit 112 without bit inversion. Accordingly, the polarity of the received digital stream is defined as "1" when the received digital stream should be bit-inverted before transmitting to the data processing unit 112. The received digital streams that were transmitted using the DPSK or DBS modulation format may have either polarity, while the polarity of the streams having the OOK modulation format is always "0".

Once the DFAS is detected, the MFSA 110 aligns frames in the received digital stream, as well as inverts the digital streams having polarity "1" before outputting such streams to the data processing unit 112. An output of the unit 112 is coupled, using a communication link 114 (e.g., wired or wireless link, gateway to the Internet, and the like), to the recipients (not shown) of the received information.

Figure 2:
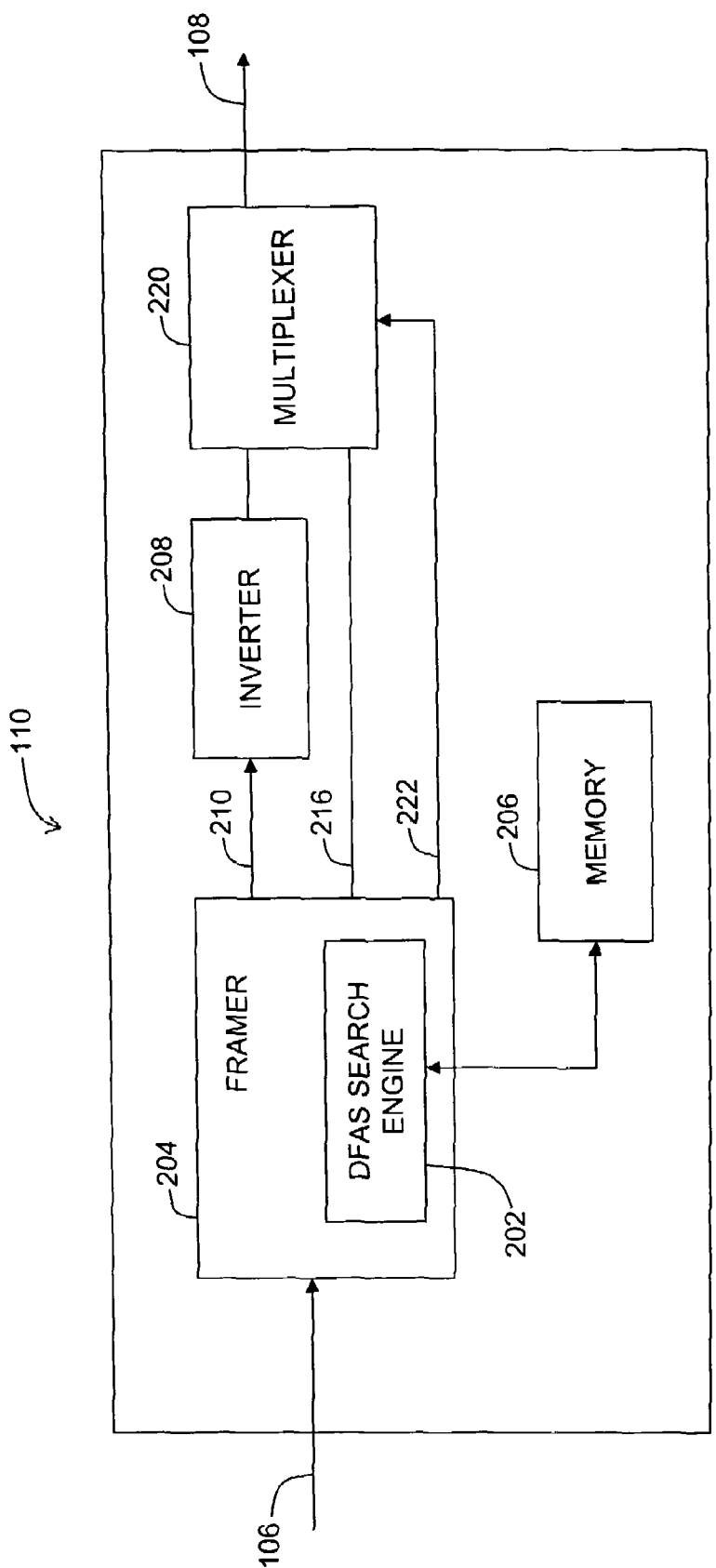
FIG. 2 depicts a schematic diagram of a frame synchronization apparatus of the receiver of FIG. 1 in accordance with one embodiment of the present invention.

FIG. 2 depicts a schematic diagram of a frame synchronization apparatus 110 in accordance with one embodiment of the present invention. The frame synchronization apparatus 110 generally comprises a framer 204 having a DFAS search engine 202, a memory 206, an inverter 208, a connection path 216, an output port 108 and a multiplexer 220. In alternate embodiments, the memory 206, the inverter 208, and/or multiplexer 220 may be a portion of the framer 204. In a further embodiment, the DFAS search engine 202 may be a program executed by a processor (not shown) of the framer 204. Because of the high speed, the search usually requires dedicated hardware. A signal processor or other processor would generally be too slow for, illustratively, 10G and 40G applications.

The framer 204 generally may use the same frame synchronization algorithm as the framers used in the digital communication systems with the OOK modulation format.

The DFAS search engine 202 (e.g., a processor) determines the bit-by-bit difference of consecutive bits in the received, via the interface 106, digital stream and forms a differential digital sequence. Denoting the received stream X as $X=x_1 x_2 \ldots$, the differential sequence V may be defined as $V=v_1 v_2 \ldots$, where $v_i=x_i+x_{i+1}$ modulo-2.

The memory 206 (e.g., a register) provides the DFAS to the framer 204. In the depicted embodiment, the DFAS is stored in the memory 206. Alternatively, the DFAS may be derived from the FAS (e.g., using the framer 204 or the search engine 202). Denoting the FAS as $S=s_1 s_2 \ldots s_h$, the DFAS is defined herein as $Q=q_1 q_2 \ldots q_{h-1}$, where $q_i=s_i+s_{i+1}$ modulo-2. The DFAS is a digital sequence that may be calculated directly using a default FAS.

To illustrate the procedure, consider a default FAS that is a 48-bit digital word (hex: F6F6F62828). This FAS, referred to as sequence S, is given by
S=1 1 1 1 0 1 1 0 1 1 1 1 0 1 1 0 1 1 1 1 0 1 1 0 0 0 1 0 1 0 0 0 0 0 1 0 1 0 0 0 0 0 1 0 1 0 0 0.

It follows that the corresponding 47-bit DFAS, given as sequence Q, is:
Q=0 0 0 1 1 0 1 1 0 0 0 1 1 0 1 1 0 0 0 1 1 0 1 0 0 1 1 1 1 0 0 0 0 1 1 1 1 0 0 0 0 1 1 1 1 0 0.

Consider now the following exemplary transmitted stream X, given by
X=????1 1 1 1 0 1 1 0 1 1 1 1 0 1 1 0 1 1 1 1 0 1 1 0 0 0 1 0 1 0 0 0 0 0 1 0 1 0 0 0???

where every character "?" serves as a placeholder for an arbitrary bit value. When DPSK or DBS is used, the sequence detected by the opto-electronic converter 104 may be one of the following sequences A or B, assuming that no errors occurred during transmission:
A=????1 1 1 1 0 1 1 0 1 1 1 1 0 1 1 0 1 1 1 1 0 1 1 0 0 0 1 0 1 0 0 0 0 0 1 0 1 0 0 0???,
B=????0 0 0 0 1 0 0 1 0 0 0 0 1 0 0 1 0 0 0 0 1 0 0 1 1 1 0 1 0 1 1 1 1 1 0 1 0 1 1 1???:

Specifically, the sequence A contains the FAS and the sequence B contains an inverted FAS (i.e., bit-inverted FAS). As such, in the apparatus 110, the FAS or the inverted FAS may also automatically be detected by scanning for the DFAS in the differential sequence V.

It can be easily verified that the differential sequence V is for both sequences equal to V=????0 0 0 1 1 0 1 1 0 0 0 1 1 0 1 1 0 0 0 1 1 0 1 0 0 1 1 1 1 0 0 0 0 1 1 1 1 0 0 0 0 1 1 1 1 0 0????In operation, the framer 204 scans (i.e., searches) the differential sequence V for the DFAS and finds it in this example at position 5. To determine the polarity, it is sufficient to inspect one of the positions in the bit stream A or B that according to the detected DFAS should contain either the FAS or the inverted FAS. If this bit is identical to the bit value at the same position in the FAS, the polarization is 0, otherwise it is 1. For instance, the last bit of the exemplary FAS (sequence S) is 0, and, knowing that either the FAS or the inverted FAS starts at position 5, it follows that if the bit value at position 53 is 0, the sequence embedded in the received sequence is equal to the FAS and the polarization is determined to be "0", and otherwise the inverted FAS occurred and the polarization is determined to be "1".

After the DFAS has been detected, the framer 204 may use conventional frame synchronization techniques to frame-align the received digital stream. Once the DFAS has been detected, the framer 204 analyses a position, e.g., the last position corresponding to the DFAS in the received digital stream to define the polarity of the received stream. In one embodiment of the invention, the polarity of the receiver is determined by inspecting the received digital stream at the position where the DFAS has been located in the differential sequence. If one of the bits corresponds to the bit value of the FAS at the corresponding position, the polarity is "0", otherwise it is "1".

When the detected polarity of the received digital stream is "0" the framer 204 outputs the stream to the multiplexer 220. Correspondingly, when the polarity of the received digital stream is "1" the stream is forwarded to the inverter 208 via an interface 210. The inverter 208 bit-inverts the received stream having polarity "1" before outputting the stream to the multiplexer 220. In operation, the multiplexer 220 is controlled, via an interface 222, by the framer 204. The multiplexer 220 selectively forwards to the data processing unit 112 the frame-aligned stream having polarity "0" or the inverted frame-aligned stream having polarity "1", respectively.

In the apparatus 110, monitoring of an in-frame monitoring state of the receiver 100 (discussed below in reference to FIG. 3) may be performed using the DFAS or, alternatively, the FAS or an inverted (i.e., bit-inverted) FAS depending upon the detected polarity (i.e, look for inverted if polarity is "1").

Figure 3:
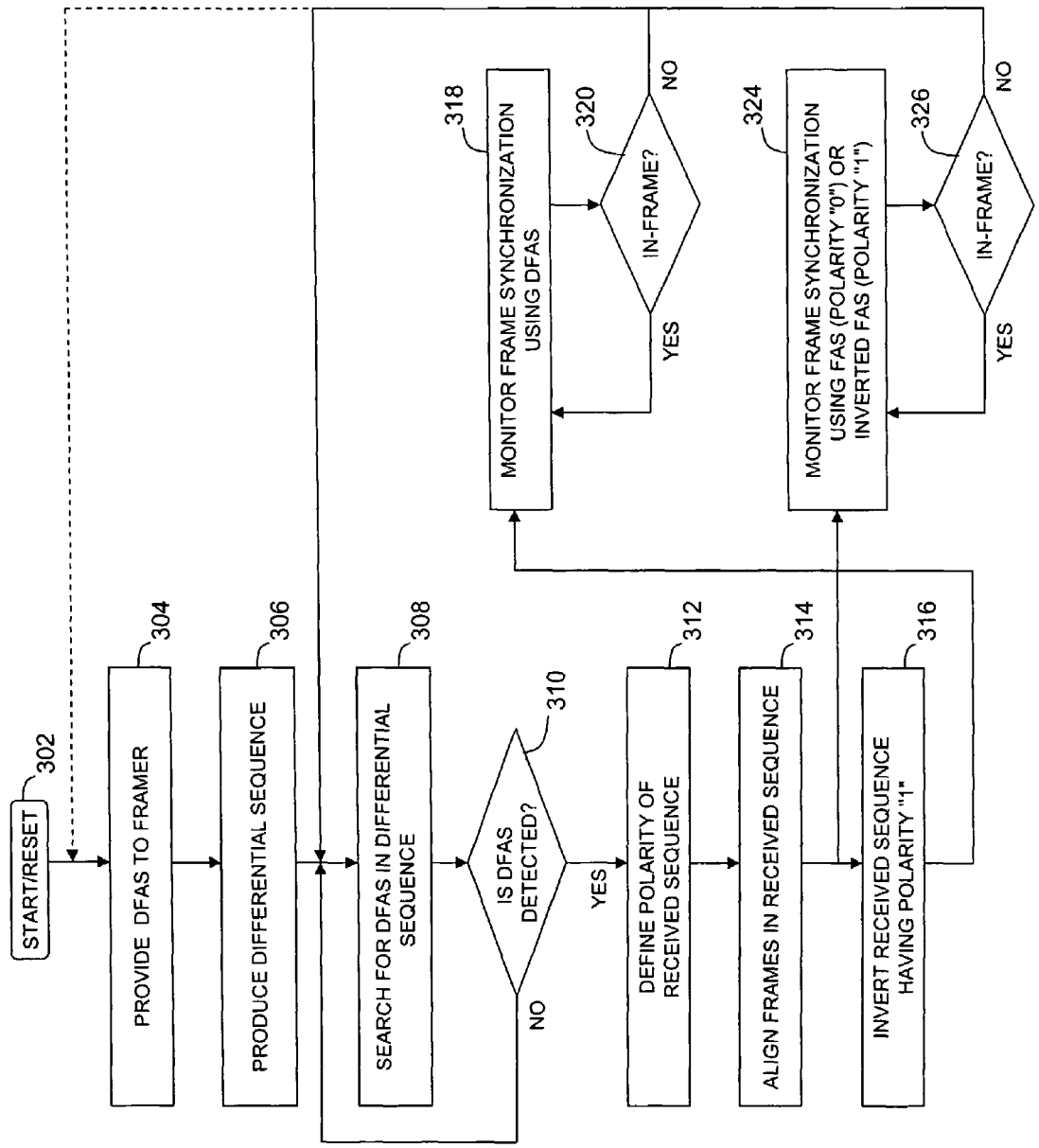
FIG. 3 depicts a flow diagram of a method of frame synchronization using the apparatus of FIG. 2 in accordance with one embodiment of the present invention.

FIG. 3 depicts a flow diagram of one embodiment of the inventive method for frame synchronization as a process 300. The process 300 uses the apparatus 110 of FIG. 2 and includes steps performed at frame synchronization of digital streams having multiple modulation formats. For best understanding of embodiments discussed below, the reader should refer simultaneously to FIG. 2.

The process 300 starts at step 302 and proceeds to step 304. At step 304, the memory 206 provides the DFAS to the framer 204. At step 306, the DFAS search engine 202 produces the differential sequence V from the received sequence X. At step 308, the framer 204 scans the differential sequence V for the DFAS. At step 310, the process 300 queries if the DFAS is detected. If the query of step 310 is negatively answered, the process 300 proceeds to step 308 to continue the scan. If the query of step 310 is affirmatively answered, the process 300 proceeds to step 312. At step 312, the framer 204 determines the polarity of the received stream, as discussed above in reference to FIG. 2. At step 314, the framer 204 synchronizes the frames in the received digital stream.

In one embodiment, after step 314, the process 300 proceeds to step 316. At step 316, the inverter 208 bit-inverts the received stream having polarity "1" before forwarding the frame-aligned stream to the data processing unit 112. At step 318, the process 300 proceeds to an in-frame monitoring state, where the input sequence is tested periodically for the presence of the DFAS at the expected positions. At step 320, the process 300 queries if the DFAS is found at the expected positions in the received stream. If the query of step 320 is answered negatively once or a predetermined number of times, the receiver 100 is considered to be out-of-frame and the process 300 proceeds to step 308 or, alternatively, step 304. If the query of step 320 is affirmatively answered, the process returns to step 318.

In an alternate embodiment, after step 314, the process 300 proceeds to step 324. At step 324, the process 300 proceeds to an in-frame monitoring state, where the input sequence is tested periodically for the presence, at the expected positions, of the FAS (streams having polarity "0") or the inverted FAS (streams having polarity "1"). At step 326, the process 300 queries if the FAS or the inverted FAS, respectively, is found at the expected positions in the received stream. If the query of step 326 is answered negatively once or a predetermined number of times, the receiver 100 is considered to be out-of-frame and the process 300 proceeds to step 308 or, alternatively, step 304. If the query of step 326 is affirmatively answered, the process returns to step 324.

The invention is described above as using specific functions and devices. It will be appreciated by those skilled in the art that a large number of functions and devices that may alternatively be employed, either individually or in combination, to achieve the purpose of the invention described herein and are within the scope of the invention.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A frame synchronization apparatus for processing a received digital stream, comprising:
    a framer communicatively coupled to a memory, a multiplexer and an inverter, said inverter feeds into said multiplexer, said framer further comprising a frame synchronization module (FSM) having a search engine for identifying a frame alignment sequence (FAS) in said received digital stream by identifying a corresponding differential frame alignment sequence (DFAS) within a differential version of the received digital stream.

2. The apparatus of claim 1, wherein a polarity of the received digital stream is defined as "1" when the last position corresponding to the DFAS in the digital stream is "1", said apparatus further comprising:
    the inverter, for bit inverting a received digital stream having a polarity of "1"; and
    the multiplexer, for selectively forwarding a frame-aligned stream having polarity "0" or the inverted frame-aligned stream having polarity "1".

3. The apparatus of claim 1, wherein the inverter is associated with said FSM.

4. The apparatus of claim 1, wherein the search engine converts a digital stream $X=x_1, x_2 \ldots$ in a differential digital stream $V=v_1, v_2 \ldots$, where $v_i=x_i+x_{i+1}$ modulo-2.

5. The apparatus of claim 4, wherein the FSM uses the differential digital stream to search for the DFAS.

6. The apparatus of claim 5, wherein the FSM uses the DFAS to synchronize frames in the received digital stream.

7. The apparatus of claim 1, wherein the FSM defines a polarity of the received digital stream.

8. The apparatus of claim 1, wherein a polarity of the receiver is determined to be "0" when one of the bits in the received digital stream at the position where the DFAS has been located in the differential sequence corresponds to the bit value of the FAS at the corresponding position.

9. The apparatus of claim 1, wherein a polarity of the digital stream is defined as "0" when the last position corresponding to the DFAS in the digital stream is "0".

10. The apparatus of claim 1, wherein the FSM uses the DFAS to monitor a state of frame synchronization of the received digital stream.

11. The apparatus of claim 1, wherein the FSM uses a frame alignment sequence (FAS) or the inverted FAS to monitor a state of frame synchronization of the received digital stream.

12. A method of frame synchronization in a digital communication system, comprising:
    (a) providing a differential frame alignment sequence (DFAS) to a frame synchronization module (FSM) implemented in a frame synchronization apparatus;
    (b) providing a digital stream and a differential digital stream to the FSM;
    (c) searching for the DFAS in the differential digital stream;
    (d) defining a polarity of the digital stream transmitted in accordance with any one of a multiple modulation formats; and
    (e) frame-aligning the digital stream using the DFAS.

13. The method of claim 12, wherein the digital stream is modulated using one of an ON/OFF Keying modulation format, a Differential Phase Shift Keying (DPSK) modulation format, and a Duobinary Signaling modulation format.

14. The method of claim 12, wherein the digital stream is defined as $X=x_1, x_2 \ldots$ and the a differential digital sequence (DDS) is defined as $V=v_1, v_2 \ldots$, where $v_i=x_i+x_{i+1}$ modulo-2.

15. The method of claim 12, wherein the step (d) further comprises:
    defining the polarity of the digital stream as "1" when the last bit corresponding to the DFAS in the digital stream is "1".

16. The method of claim 12, wherein the step (e) further comprises:
    bit-inverting the digital stream.

17. The method of claim 12, wherein the step (d) further comprises:
    defining the polarity of the digital stream as "0" when the last bit corresponding to the DFAS in the digital stream is "0".

18. The method of claim 12, wherein the step (e) further comprises:
    using the DFAS to monitor a state of frame synchronization of the received digital stream.

19. The method of claim 12, wherein the step (e) further comprises:
    using a frame alignment sequence (FAS) or the inverted FAS to monitor a state of frame synchronization of the received digital stream.

* * * * *

UNITED STATES PATENT AND TRADEMARK OFFICE
CERTIFICATE OF CORRECTION

PATENT NO. : 7,616,724 B2
APPLICATION NO. : 10/957527
DATED : November 10, 2009
INVENTOR(S) : Ballester et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Nineteenth Day of October, 2010

David J. Kappos
*Director of the United States Patent and Trademark Office*